(12) United States Patent
Forutanpour et al.

(10) Patent No.: US 9,736,701 B2
(45) Date of Patent: Aug. 15, 2017

(54) DEAD RECKONING USING PROXIMITY SENSORS

(75) Inventors: Babak Forutanpour, San Diego, CA (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 13/475,603

(22) Filed: May 18, 2012

(65) Prior Publication Data
US 2013/0130725 A1    May 23, 2013

Related U.S. Application Data

(60) Provisional application No. 61/553,035, filed on Oct. 28, 2011.

(51) Int. Cl.
*H04W 24/00* (2009.01)
*G01C 21/16* (2006.01)
*G06F 1/16* (2006.01)
*G01C 22/00* (2006.01)

(52) U.S. Cl.
CPC .......... *H04W 24/00* (2013.01); *G01C 21/165* (2013.01); *G01C 22/006* (2013.01); *G06F 1/1684* (2013.01)

(58) Field of Classification Search
CPC ... H04W 4/02; H04W 48/16; H04W 52/0261; H04W 24/00; H04W 4/008; H04W 52/0254; G06F 3/0346; G06F 3/03; G06F 1/1684; G01C 21/165; G01C 22/006; G01C 21/12; G01C 21/0048; G01C 21/49; G01C 21/51; G01S 19/26; G01S 19/42; G01S 19/49; G01S 5/0284; G01S 19/34; G01S 19/0048; G01S 19/51; H04M 2250/12
USPC .......... 701/472, 525, 533; 455/456.1, 456.2, 455/456.3, 574
See application file for complete search history.

(56) References Cited

U.S. PATENT DOCUMENTS

| | | |
|---|---|---|
| 6,546,336 B1 | 4/2003 | Matsuoka et al. |
| 7,429,936 B2 | 9/2008 | Paradiso et al. |
| 8,000,736 B2 | 8/2011 | Forstall et al. |
| 8,006,002 B2 | 8/2011 | Kalayjian et al. |

(Continued)

FOREIGN PATENT DOCUMENTS

| | | |
|---|---|---|
| CN | 101006358 A | 7/2007 |
| CN | 101382431 A | 3/2009 |

(Continued)

OTHER PUBLICATIONS

International Search Report and Written Opinion—PCT/US2012/061698—ISA/EPO—dated Jan. 1, 2013.

*Primary Examiner* — George Eng
*Assistant Examiner* — Hung Du
(74) *Attorney, Agent, or Firm* — Kilpatrick Townsend & Stockton

(57) ABSTRACT

Various arrangements for limiting inaccuracy of dead reckoning are presented. Proximity data may be collected using a plurality of proximity sensors of a mobile device. A position of the mobile device may be determined in relation to a user using the proximity data. Whether to determine a location of the mobile device using a dead reckoning technique may be determined at least partially based on the position of the mobile device in relation to the user.

38 Claims, 8 Drawing Sheets

(56) References Cited

U.S. PATENT DOCUMENTS

| | | | |
|---|---|---|---|
| 8,253,684 B1* | 8/2012 | Lloyd | G06F 3/017 345/156 |
| 2007/0103548 A1* | 5/2007 | Carter | H04M 11/025 348/143 |
| 2009/0109795 A1* | 4/2009 | Marti | 367/118 |
| 2009/0147215 A1* | 6/2009 | Howell et al. | 351/158 |
| 2010/0048256 A1* | 2/2010 | Huppi et al. | 455/574 |
| 2010/0103844 A1* | 4/2010 | Kim | 370/254 |
| 2010/0164479 A1 | 7/2010 | Alameh et al. | |
| 2010/0179757 A1* | 7/2010 | Iketani | G01S 19/49 701/472 |
| 2011/0012840 A1* | 1/2011 | Hotelling et al. | 345/173 |
| 2011/0171909 A1* | 7/2011 | Jung | H04W 48/16 455/41.2 |
| 2011/0172909 A1* | 7/2011 | Kahn et al. | 701/202 |
| 2011/0184646 A1* | 7/2011 | Wong | G01S 5/0284 701/300 |
| 2012/0306770 A1* | 12/2012 | Moore et al. | 345/173 |

FOREIGN PATENT DOCUMENTS

| | | | |
|---|---|---|---|
| JP | 2004064163 A | 2/2004 | |
| JP | 2010507870 A | 3/2010 | |
| JP | 2011504578 A | 2/2011 | |
| WO | WO-2008051472 A1 | 5/2008 | |
| WO | WO-2009049924 A2 | 4/2009 | |

\* cited by examiner

DEAD RECKONING USING PROXIMITY SENSORS

CROSS REFERENCES

This non-provisional application claims priority to provisional application 61/553,035, entitled "Dead Reckoning Using Proximity Sensors," filed Oct. 28, 2011. This provisional application is hereby incorporated by reference in its entirety for all purposes.

BACKGROUND

Location determining techniques, such as GPS, cellular signal triangulation, or forward link timing, may be used to determine the location of a mobile device. Such a location determining technique may work well when a signal is available from an appropriate number of satellites or cellular towers, such as three. However, if the mobile device cannot receive a signal from the appropriate number of satellites or cellular towers, the position of the mobile device may not be able to be determined using the location determining technique. For example, when a mobile device is located within a structure, such as a building, it may be difficult to consistently (or even sporadically) use a GPS-based location determining technique due to interference to signals caused by the structure and/or objects within the structure. As such, determining a position within the structure using the mobile device may not be possible if GPS or cellular signals are the only available location determining technique.

SUMMARY

In some embodiments, a method for limiting inaccuracy of dead reckoning is presented. The method may include collecting proximity data using a plurality of proximity sensors of a mobile device. The method may include determining a position of the mobile device in relation to a user using the proximity data. The method may include determining whether to determine a location of the mobile device using a dead reckoning technique at least partially based on the position of the mobile device in relation to the user.

Embodiments of such a method may include one or more of the following: The method may include tracking the position of the mobile device for a period of time, wherein a length of the period of time at least partially depends on the position of the mobile device in relation to the user. If the mobile device is determined to be proximate to a chest or a leg of the user, the position of the mobile device may be tracked using the dead reckoning technique for a first period of time. If the mobile device is determined to be proximate to an ear of the user, the position of the mobile device may be tracked using the dead reckoning technique for a second period of time shorter than the first period of time. If the mobile device is determined to be gripped in a hand of the user, the position of the mobile device may be tracked using the dead reckoning technique for a second period of time shorter than the first period of time. The method may include, in response to determining whether to determine the position of the mobile device using the dead reckoning technique, cease tracking the location of the mobile device. The dead reckoning technique may comprise using acceleration data to determine the location of the mobile device. The method may include determining a fix location using a location determining technique, wherein the fix location is used as a starting location for determining the location of the mobile device using the dead reckoning technique. The method may include collecting acceleration data using an accelerometer of the mobile device. The method may include determining the location of the mobile device using the acceleration data. The plurality of proximity sensors may be a plurality of capacitive proximity sensors. If the mobile device is determined to be remote from the user, the position of the mobile device may not tracked using the dead reckoning technique. A first proximity sensor of the plurality of proximity sensors may be proximate to a speaker of the mobile device. A second proximity sensor of the plurality of proximity sensors may be positioned for use in determining when the user is gripping the mobile device.

In some embodiments, a mobile device configured to limit inaccuracy of dead reckoning is presented. The mobile device may include a plurality of proximity sensors. The mobile device may include a processor. The mobile device may include a memory communicatively coupled with and readable by the processor and having stored therein processor-readable instructions. When executed by the processor, the processor-readable instructions cause the processor to collect proximity data using the plurality of proximity sensors. The processor-readable instructions may be further comprise processor-readable instructions, which, when executed, cause the processor to determine a position of the mobile device in relation to a user using the proximity data. The processor-readable instructions may be further comprise processor-readable instructions, which, when executed, cause the processor to determine whether to determine a location of the mobile device using a dead reckoning technique at least partially based on the position of the mobile device in relation to the user.

Embodiments of such a mobile device may include one or more of the following: The processor-readable instructions may further comprise processor-readable instructions, which, when executed by the processor, cause the processor to: track the position of the mobile device for a period of time, wherein a length of the period of time at least partially depends on the position of the mobile device in relation to the user. If the mobile device is determined to be proximate to a chest or a leg of the user, the processor-readable instructions may be configured to cause the position of the mobile device to be tracked using the dead reckoning technique for a first period of time. If the mobile device is determined to be proximate to an ear of the user, the processor-readable instructions may be configured to cause the position of the mobile device to be tracked using the dead reckoning technique for a second period of time shorter than the first period of time. If the mobile device is determined to be gripped in a hand of the user, the processor-readable instructions may be configured to cause the position of the mobile device to be tracked using the dead reckoning technique for a second period of time shorter than the first period of time. The processor-readable instructions may further comprise processor-readable instructions, which, when executed by the processor, cause the processor to, in response to determining whether to determine the position of the mobile device using the dead reckoning technique, cease tracking the location of the mobile device.

Embodiments of such a mobile device may include one or more of the following: The mobile device may include an accelerometer, wherein the dead reckoning technique comprises using acceleration data from the accelerometer to determine the location of the mobile device. The mobile device may include a location determining module. The processor-readable instructions may further comprise processor-readable instructions, which, when executed by the processor, cause the processor to determine a fix location using a location determining technique, wherein the fix location is used as a starting location for determining the location of the mobile device using the dead reckoning technique. The processor-readable instructions may be further comprise processor-readable instructions, which, when executed, cause the processor to analyze the acceleration data from the accelerometer. The processor-readable instructions may be further comprise processor-readable instructions, which, when executed, cause the processor to determine the location of the mobile device using the acceleration data. The plurality of proximity sensors may be a plurality of capacitive proximity sensors. If the mobile device is determined to be remote from the user, the position of the mobile device may not tracked using the dead reckoning technique. A first proximity sensor of the plurality of proximity sensors may be proximate to a speaker of the mobile device. A second proximity sensor of the plurality of proximity sensors may be positioned for use in determining when the user is gripping the mobile device. A third proximity sensor of the plurality of proximity sensors may be proximate to a back of the mobile device, wherein the first proximity sensor and the second proximity sensor are on a face of the mobile device.

In some embodiments, a computer program product for limiting inaccuracy of dead reckoning, the computer program product comprising processor-readable instructions. The processor-readable instructions, when executed by a processor, may cause the processor to analyze proximity data received from a plurality of proximity sensors. The processor-readable instructions, when executed by a processor, may cause the processor to determine a position of the mobile device in relation to a user using the proximity data. The processor-readable instructions, when executed by a processor, may cause the processor to determine whether to determine a location of the mobile device using a dead reckoning technique at least partially based on the position of the mobile device in relation to the user.

Embodiments of such a computer program may include one or more of the following: The processor-readable instructions, when executed by a processor, may cause the processor to track the position of the mobile device for a period of time, wherein a length of the period of time at least partially depends on the position of the mobile device in relation to the user. If the mobile device is determined to be proximate to a chest or a leg of the user, the processor-readable instructions may be configured to cause the position of the mobile device to be tracked using the dead reckoning technique for a first period of time. If the mobile device is determined to be proximate to an ear of the user, the processor-readable instructions may be configured to cause the position of the mobile device to be tracked using the dead reckoning technique for a second period of time shorter than the first period of time. If the mobile device is determined to be gripped in a hand of the user, the processor-readable instructions may be configured to cause the position of the mobile device to be tracked using the dead reckoning technique for a second period of time shorter than the first period of time. The processor-readable instructions, when executed by a processor, may cause the processor to, in response to determining whether to determine the position of the mobile device using the dead reckoning technique, cease tracking the location of the mobile device. The dead reckoning technique may comprise using acceleration data to determine the location of the mobile device. The processor-readable instructions, when executed by a processor, may cause the processor to determine a fix location using a location determining technique, wherein the fix location is used as a starting location for determining the location of the mobile device using the dead reckoning technique. The processor-readable instructions, when executed by a processor, may cause the processor to analyze the acceleration data received from an accelerometer of the mobile device. The processor-readable instructions, when executed by a processor, may cause the processor to determine the location of the mobile device using the acceleration data. If the mobile device is determined to be remote from the user, the position of the mobile device may not tracked using the dead reckoning technique. A first proximity sensor of the plurality of proximity sensors may be proximate to a speaker of the mobile device. A second proximity sensor of the plurality of proximity sensors may be positioned for use in determining when the user is gripping the mobile device.

In some embodiments, an apparatus for limiting inaccuracy of dead reckoning is presented. The apparatus may include means for collecting proximity data on a mobile device. The apparatus may include means for determining a position of the mobile device in relation to a user using the proximity data. The apparatus may include means for determining whether to determine a location of the mobile device using a dead reckoning technique at least partially based on the position of the mobile device in relation to the user.

Embodiments of such an apparatus may include one or more of the following: The apparatus may include means for tracking the position of the mobile device for a period of time, wherein a length of the period of time at least partially depends on the position of the mobile device in relation to the user. If the mobile device is determined to be proximate to a chest or a leg of the user, the position of the mobile device may be tracked using the dead reckoning technique for a first period of time. If the mobile device is determined to be proximate to an ear of the user, the position of the mobile device may be tracked using the dead reckoning technique for a second period of time shorter than the first period of time. If the mobile device is determined to be gripped in a hand of the user, the position of the mobile device may be tracked using the dead reckoning technique for a second period of time shorter than the first period of time. The apparatus may include means to cease tracking the location of the mobile device in response to the means for determining whether to determine the position of the mobile device using the dead reckoning technique. The dead reckoning technique may comprise using acceleration data to determine the location of the mobile device. The apparatus may include means for determining a fix location, wherein the fix location is used as a starting location for determining the location of the mobile device using the dead reckoning technique. The apparatus may include means for collecting acceleration data of the mobile device. The apparatus may include means for determining the location of the mobile device using the acceleration data. If the mobile device is determined to be remote from the user, the position of the mobile device may not be tracked using the dead reckoning technique.

DETAILED DESCRIPTION

Figure 1:
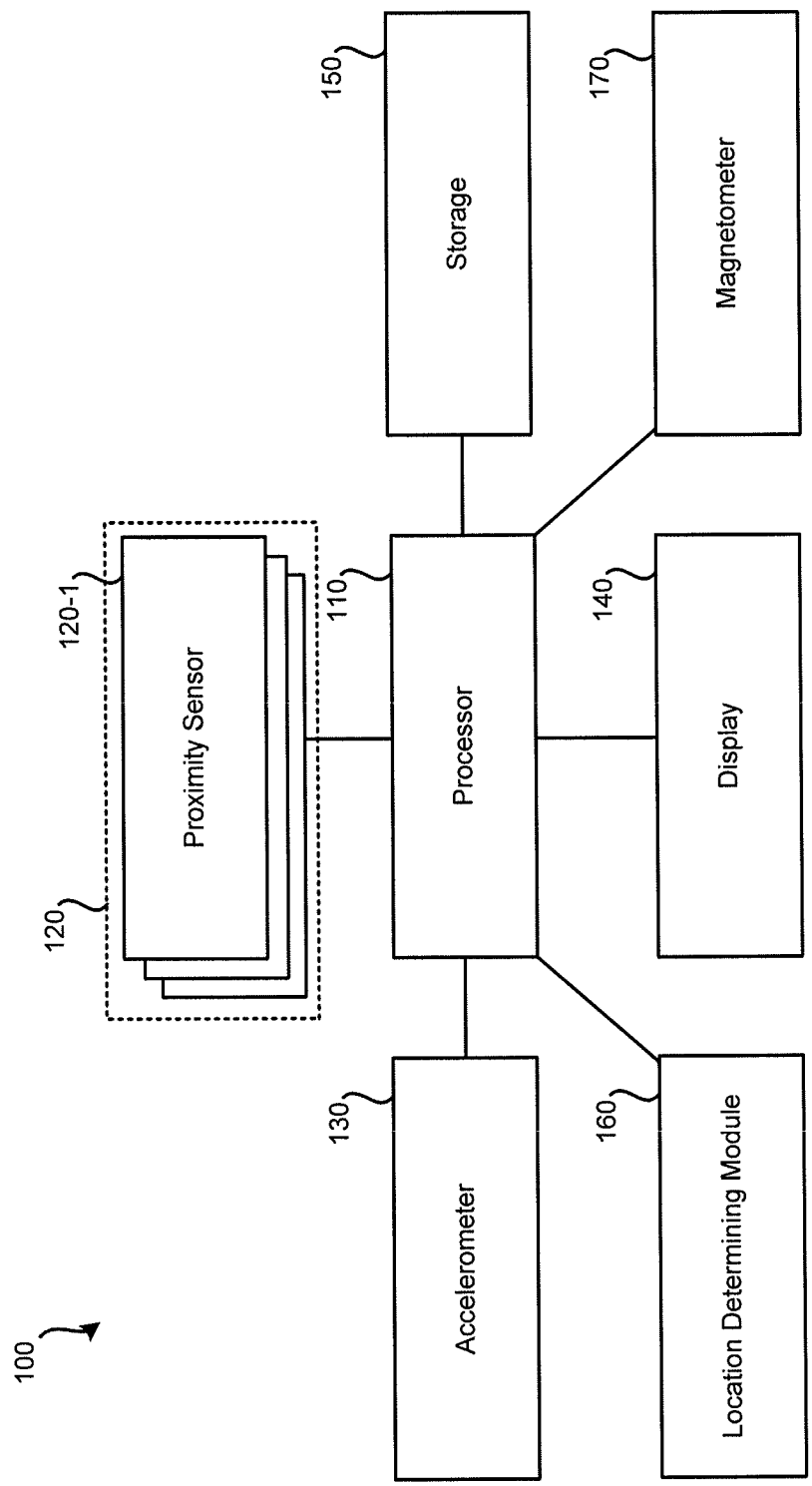
FIG. 1 illustrates a block diagram of an embodiment of a system configured to use a plurality of proximity sensors for limiting the inaccuracy of dead reckoning.

Dead reckoning may involve determining a current location using a previously determined location in conjunction with a known or estimated speed, time of travel, and/or direction of movement. As such, using a previous location of a mobile device, a new location of the mobile device may be determined based on a determined movement of the mobile device and/or a determined direction. In some embodiments, once a location determining technique, such as GPS, cellular signal triangulation, or forward link timing, can no longer be used (for example, due to entering a building that interferes with reception of an adequate signal), dead reckoning may be used. Dead reckoning may commence from the last location (referred to as the "fix") determined using the location determining technique. As such, when a location determining technique is unavailable, at least an approximate location may be determined using dead reckoning.

Dead reckoning may involve data from an accelerometer and, possibly, a magnetometer of a mobile device being used to determine at least an approximate location of the mobile device when a location determining technique is unavailable. Dead reckoning may be the process of calculating a current position by using a previously determined position and modifying the previously determined position based upon known or estimated movement and course. Information indicative of displacement may be used, such as via a dead reckoning technique, to determine a relative location. As an example, information indicative of displacement may be used by a mobile device in determining when a user possessing the mobile device has taken a step and in which direction the step was taken. A new location of the mobile device and the user possessing the mobile device may then be determined. Such a dead reckoning technique may allow for a user's relative location to be tracked in an area where GPS and/or cellular service is unavailable, such as within some buildings.

The accuracy of a location determined using dead reckoning may vary depending on where a mobile device being used to perform the dead reckoning technique is positioned in relation to the user. A correct determination of whether a user has taken a step may be more likely if the mobile device is located in certain positions in relation to the user as opposed to other positions in relation to the user. For example, based on input from one or more proximity sensors, if the mobile device is determined to be positioned against or near (collectively referred to as "proximate") to the user's chest or legs (e.g., in a shirt or pant pocket), acceleration data from one or more accelerometers may be used for dead reckoning with a (relatively) high level of accuracy to determine a location of the user and/or track the user as he or she walks. If the mobile device is being held by the user proximate to an ear of the user, the acceleration data may be less accurate for determining when a step has been taken than when the mobile device is proximate to the user's chest or legs, but may still be useful in determining the user's location, possibly for a shorter distance and/or a shorter period of time. If the mobile device is being held in the user's hand (and not against an ear of the user), less accurate acceleration data for determining a location of the user using the dead reckoning technique may be received from the accelerometer than when the mobile device was proximate to the ear, chest, or leg of the user. Finally, if the mobile device is remote from the user, that is, the mobile device is not proximate to the user (e.g., the mobile device is in a purse or backpack being worn by the user), dead reckoning may not be performed because of a high error rate of determining when a step has been taken using the dead reckoning technique compared to the other possible positions of the mobile device in relation to the user. The high error rate in determining whether the user has taken a step may be due to the purse or backpack that is holding the mobile device bouncing around, resulting in acceleration data that is not indicative of the user's movement. As such, whether dead reckoning is performed and/or the amount of time or distance for which dead reckoning is performed may vary based on where the mobile device is determined to be positioned in relation to the user.

Due to dead reckoning being less accurate when the mobile device is located in certain positions in relation to the user, it may be useful to limit for how long, in time and/or distance, that dead reckoning is performed. This distance and/or time may be at least partially based on the position of the mobile device in relation to the user. Beyond a certain distance and/or time, the location determined using dead reckoning may be inaccurate enough to not be considered useful. Thus, beyond this distance and/or time, dead reckoning may be a waste of power and/or processing resources of the mobile device.

To determine where the mobile device is positioned in relation to the user, one or more proximity sensors located on the mobile device may be used. Proximity sensors can be used to detect if a triggering entity, such as a portion of a human body (e.g., a hand) is either 1) in contact with a proximity sensor or 2) near the proximity sensor, collectively referred to as being proximate to the proximity sensor. One type of proximity sensor is a capacitive proximity sensor that detects changes in capacitance. Such a capacitive proximity sensor may include one or two electrodes. A dual-electrode capacitive proximity sensor may detect the presence of a triggering entity by measuring changes in capacitance between the two electrodes. Use of a capacitive proximity sensor may have the advantage of being more likely to be triggered by a user's body than by conductive objects, such as coins or keys, if the electrodes are appropriately spaced and located on the mobile device. Further, because capacitive proximity sensors can be triggered if a portion of a human body is near but not touching the capacitive proximity sensor, that portion of the human body may trigger the capacitive proximity sensor through thin materials such as cloth (e.g., pants, gloves), mobile device cases, and mobile device protective covers. As such, the presence of the user's body, such as a leg, may be detected through another material, such as cloth (e.g., pants).

Proximity sensors, which may be capacitive proximity sensors, may be arranged on a mobile device, such as a tablet computer, a cellular phone, smartphone, gaming device or some other type of mobile device, to detect where the mobile device is positioned in relation to the user. To do this, multiple sets of dual-electrode capacitive proximity sensors can be used. In some embodiments, multiple single-electrode capacitive proximity sensors are used. For example, one pair of electrodes for capacitive proximity sensors may be arranged on opposite sides of a mobile device to detect touch in regions of the mobile device typically held by a user. If such a dual-electrode proximity sensor (or pair of single-electrode proximity sensors) outputs data that indicate proximity to a triggering entity, it may be assumed the mobile device is being held in a user's hand.

Readings from multiple proximity sensors may be used to determine the position of the mobile device in relation to the user. For example, if data from proximity sensors arranged to detect the grip of a user indicates proximity to a triggering entity (sufficiently to indicate that a user is likely holding the mobile device) along with one or more proximity sensors located near a speaker of the mobile device outputting proximity data that indicates proximity to a triggering entity, it may be determined that the mobile device is likely being held to an ear of the user. If only proximity data from proximity sensors arranged to detect the grip of a user's hand indicates proximity to a triggering entity, it may be determined that the mobile device is being held in front of the user or carried at the user's side. If one or more proximity sensors on the front or back of the mobile device indicates proximity to a triggering entity, but the grip proximity sensor does not, it may be determined the mobile device is in a pocket of the user (e.g., a shirt or pant pocket). It may be possible to determine other positions of a mobile device in relation to a user.

Based on where the mobile device is positioned in relation to the user, dead reckoning: 1) may or may not be used; and 2) if used, dead reckoning may be used for up to a maximum period of time and/or maximum determined distance. For example, a dead reckoning technique may involve gathering data from one or more accelerometers and one or more magnetometers of a mobile device to determine when a user has taken a step and/or the direction of the step. The ability to accurately determine that a step has been taken and/or the direction of the step may vary according to where the mobile device is positioned in relation to the user. For example, if the mobile device is in a pocket of the user, acceleration data collected using one or more accelerometers may be more accurate for use for dead reckoning than if the mobile device is being held to an ear of the user. Based on where the mobile device is determined to be positioned in relation to the user, a determination may be made as to whether dead reckoning should be performed and, if so, for how long of a period of time or for how far of a distance dead reckoning should be performed before stopping. The maximum time or distance that dead reckoning may be performed for may be limited because the longer time or distance dead reckoning is performed the less accurate it is likely to become. Once dead reckoning is no longer used, some or all of the components of the mobile device used for dead reckoning may be deactivated. Such deactivation may conserve battery power.

FIG. 1 illustrates an embodiment of a system 100 configured for limiting the inaccuracy of dead reckoning. System 100 may also be configured to perform a dead reckoning technique. System 100 includes: processor 110, proximity sensors 120, accelerometer 130, display 140, storage 150, location determining module 160, and magnetometer 170. System 100 may be part of a larger system. For example, system 100 may be part of a mobile device that contains additional components. For example, the mobile device that system 100 may be a part of may be a cellular phone (e.g., a smartphone), a tablet computer, a personal digital assistant, or gaming device, to name only a few examples. System 100 may be part of the computer system, such as computer system 900 of FIG. 9.

Processor 110 may be a general purpose or specialized processor configured to receive and process data from one or more sensors, such as proximity sensors 120, accelerometer 130, and magnetometer 170. Processor 110 may also interact with storage 150 and display 140, and receive position data from location determining module 160.

Processor 110 may be in communication with proximity sensors 120. System 100 may include one or more proximity sensors 120. As such, some embodiments may have two, three, four, or more proximity sensors in communication with processor 110. Each proximity sensor, such as proximity sensor, 120-1, may include a single-electrode capacitive proximity sensor. In some embodiments, one or more of the proximity sensors may be dual-electrode capacitive proximity sensors. As such, each proximity sensor, such as proximity sensor 120-1, may include one or two electrodes. Each of these proximity sensors may periodically transmit data to processor 110 that indicates whether a triggering entity is within range of the proximity sensor. Each proximity sensor may also transmit a magnitude value that indicates how close a triggering entity is to the electrode(s) of the proximity sensor. The triggering entity may be any entity that causes the measured capacitance by the proximity sensor to vary. When being used by a user, part of the user's body may serve as the triggering entity. A user's hand near a proximity sensor may be sensed as the triggering entity by the proximity sensor. Such proximity sensors may be configured to determine when a triggering entity is in contact with the proximity sensor and when a triggering entity is close to the proximity sensor (collectively referred to as proximate). As such, for each proximity sensor of proximity sensors 120 to detect the presence of a triggering entity, the triggering entity does not need to be in direct contact with one or more electrodes of the proximity sensor.

While the above description of proximity sensors focuses on the use of capacitive proximity sensors, it should be understood that in some embodiments proximity sensors other than capacitive proximity sensors may be used. Further, some embodiments may use multiple types of proximity sensors; for example, a mobile device may contain both single-electrode and dual-electrode capacitive proximity sensors and/or other types of proximity sensors.

Processor 110 may be in communication with one or more accelerometers, such as accelerometer 130. Accelerometer 130 may provide acceleration data to processor 110. Such acceleration data may indicate a direction of acceleration and a magnitude of acceleration. For example, when a user possessing system 100 takes a step, acceleration data from accelerometer 130 may indicate a change in acceleration that can be used by processor 110 to determine a step has been taken. In some embodiments, more accurate results may be achieved by receiving acceleration data from multiple accelerometers. Such data may be averaged or otherwise combined by processor 110. Accelerometer 130 may be disabled when dead reckoning is not being performed, thus conserving power.

Processor 110 may be in communication with display 140. Display 140 may be used to visually present text and/or graphics to a user of a mobile device. Whether display 140 is active or inactive (e.g., turned on or off) may be based on data received from proximity sensors 120. For example, display 140 may be activated when proximity data from proximity sensors 120 indicate that the mobile device containing system 100 is being held in the hand of the user. If data from proximity sensors 120 indicate that the mobile device containing system 100 is being held in the hand of the user and is likely proximate to an ear of the user, display 140 may be inactivated because the user is unlikely to be viewing display 140. When data from proximity sensors 120 indicate that the mobile device has been moved away from an ear of the user, display 140 may be reactivated. As such, power consumed by display 140 may be decreased by decreasing the amount of time that display 140 is active.

Processor 110 may be able to read data from and write data to storage 150. Storage 150 may be used to store data such as: how far of a distance is determined to be travelled with each detected step, how long a period of time and/or how far of a distance dead reckoning should be allowed to be performed based on the position of system 100 in relation to the user, and/or whether certain components of system 100 should be disabled when dead reckoning is not being performed.

Location determining module 160 may represent a global navigation satellite system module, such as a GPS module, a cellular signal triangulation module, or a forward link timing module. More generally, location determining module 160 may determine an absolute location by making an absolute location measurement. Such an absolute location measurement does not necessarily mean high accuracy; an absolute location may refer to a location measurement made in a coordinate system such as latitude and longitude, street address, etc. When location determining module 160 is able to receive an adequate signal, which may involve receiving a signal from the appropriate number of satellites or cellular towers, processor 110 may use data from location determining module 160 to determine the position of system 100. When an accurate location cannot be determined using location determining module 160, processor 110 may rely on a dead reckoning technique to determine the position of system 100. Processor 110 may use the last accurate position received from location determining module 160 to use as the fix for the dead reckoning technique.

System 100 may include one or more magnetometers, such as magnetometer 170. Magnetometer 170 may be in communication with processor 110. Magnetometer 170 may be used to determine a direction in which system 100 is pointed. Magnetometer 170 may be configured to identify a compass direction in which system 100 is pointed. As such, magnetometer 170 may output data to processor 110 that indicates a compass direction. If accelerometer 130 is used to determine when a step by a user holding a mobile device containing system 100 has been taken, magnetometer 170 may be used to determine the compass direction of the step.

Figure 2:
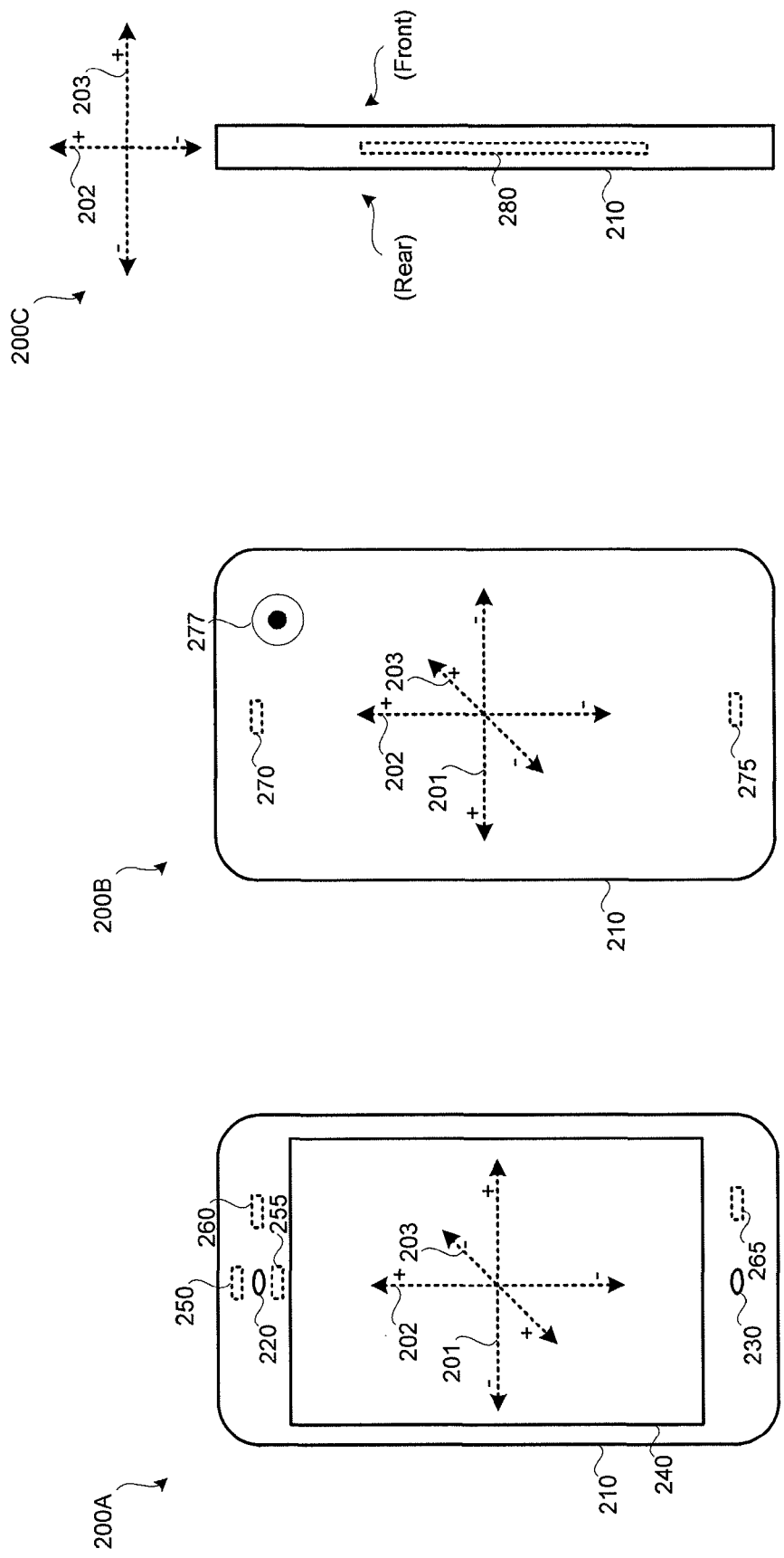
FIG. 2A illustrates an embodiment of a mobile device configured to use a plurality of proximity sensors for limiting the inaccuracy of dead reckoning.
FIG. 2B illustrates another embodiment of a mobile device configured to use a plurality of proximity sensors for limiting the inaccuracy of dead reckoning.
FIG. 2C illustrates an embodiment of a mobile device configured to use a plurality of proximity sensors for limiting the inaccuracy of dead reckoning.

FIG. 2A illustrates a front view of an embodiment of a mobile device 200A configured to use a plurality of proximity sensors for limiting the inaccuracy of dead reckoning. Mobile device 200A may include system 100 of FIG. 1 or some other system configured to use a plurality of proximity sensors for limiting the inaccuracy of dead reckoning. As illustrated, the front of mobile device 200A is shown with display 240. Mobile device 200A may include case 210. Mobile device 200A may also include speaker 220 and microphone 230. Coupled with case 210 may be a plurality of proximity sensors, such as proximity sensors 250, 255, 260, and 265. Proximity sensors 250 and 255 may represent two single-electrode proximity sensors or two electrodes of a single dual-electrode proximity sensor. Proximity sensors 250 and 255 may be proximate to speaker 220. Proximity sensors 250 and 255 may be used to determine when the speaker of mobile device 200A is likely proximate to a user's ear. Proximity sensors 260 and 265 may represent two single-electrode proximity sensors or two electrodes of a single dual-electrode proximity sensor. Proximity sensors 260 and 265 may be used to determine when mobile device 200A is likely against the body of the user, such as in a shirt or pant pocket. Proximity sensors 260 and 265 may be separated from each other enough such that the presence of common pocket items, such as change and/or keys, is not mistaken for proximity to a user's body. Each proximity sensor is illustrated using dotted lines to indicate that each proximity sensor may not be visible external to the mobile device, rather each proximity sensor may be located within case 210 such that the proximity sensors are not visible to a user. In some embodiments, the proximity sensors may be arranged such as to be visible to users.

FIG. 2B illustrates a rear view of an embodiment of a mobile device configured to use a plurality of proximity sensors for limiting the inaccuracy of dead reckoning. Mobile device 200B may be mobile device 200A of FIG. 2A viewed from a different perspective (e.g., from the rear of mobile device 200A such that display 240 is not visible). Coupled with the rear of case 210 may be a plurality of proximity sensors, such as proximity sensors 270 and 275. Proximity sensors 270 and 275 may represent two single-electrode proximity sensors or two electrodes of a single dual-electrode proximity sensor. Proximity sensors 270 and 275 may be used to determine when mobile device 200B is against the body of the user, such as in a shirt or pant pocket. Proximity sensors 270 and 275 may be separated from each other enough such that the presence of common pocket items, such as change and/or keys, are not mistaken for proximity to a user's body. Proximity sensors 270 and 275 are illustrated using dotted lines to indicate that each proximity sensor may not be visible, rather each proximity sensor may be located within case 210 such that the proximity sensors are not visible to a user. The number of proximity sensors on mobile device 200B is for example purposes only, more or fewer proximity sensors may be present on each side.

Also present on mobile device 200B is camera 277. Camera 277 may be used for capturing still images and/or video. Camera 277 may also be used for purposes such as augmented reality functions, video chat, etc. In some embodiments, alternatively or additionally, a front-facing camera may be present on mobile device 200A.

FIG. 2C illustrates a side view of an embodiment of a mobile device configured to use a plurality of proximity sensors for limiting the inaccuracy of dead reckoning. Mobile device 200C may be mobile device 200A of FIG. 2A and mobile device 200B of FIG. 2B viewed from a side, such as the left or right. Proximity sensor 280 may be present on mobile device 200C. Proximity sensor 280 may be a single-electrode capacitive proximity sensor or may represent an electrode of a dual-electrode proximity sensor. Another proximity sensor (or electrode of a dual capacitive proximity sensor) may be on the opposite side of mobile device 200C. As such, proximity to the region where a user typically grips the mobile device during use (e.g., conducting a phone call, reading email) may be sensed by proximity sensor 280 (and the complementary proximity sensor or electrode). Additional proximity sensors on the side of mobile device 200C may also be present.

Also illustrated in FIGS. 2A through 2C are imaginary axes, represented by dotted arrows. Such axes are in a coordinate system of the mobile device. The direction of acceleration as detected by one or more accelerometers of a mobile device may be interpreted in accordance with such a coordinate system. Referring to FIG. 2A, x-axis 201 is positive to the right (as illustrated) and negative to the left (as illustrated). Y-axis 202 is positive toward the top (as illustrated) of mobile device 200A, and negative toward the bottom (as illustrated). Z-axis 203 passes through mobile device 200A as illustrated in FIG. 2C. The polarity of x-axis 201 and z-axis 203 appear reversed in FIG. 2B; this is because the mobile device is flipped and, as such, to remain in the coordinate system of the mobile device, these axes must also be flipped. FIG. 2C illustrates y-axis 202 and z-axis 203. In FIG. 2C, the front of the device containing display 240 (not shown) is on the right (as illustrated).

Figure 3:
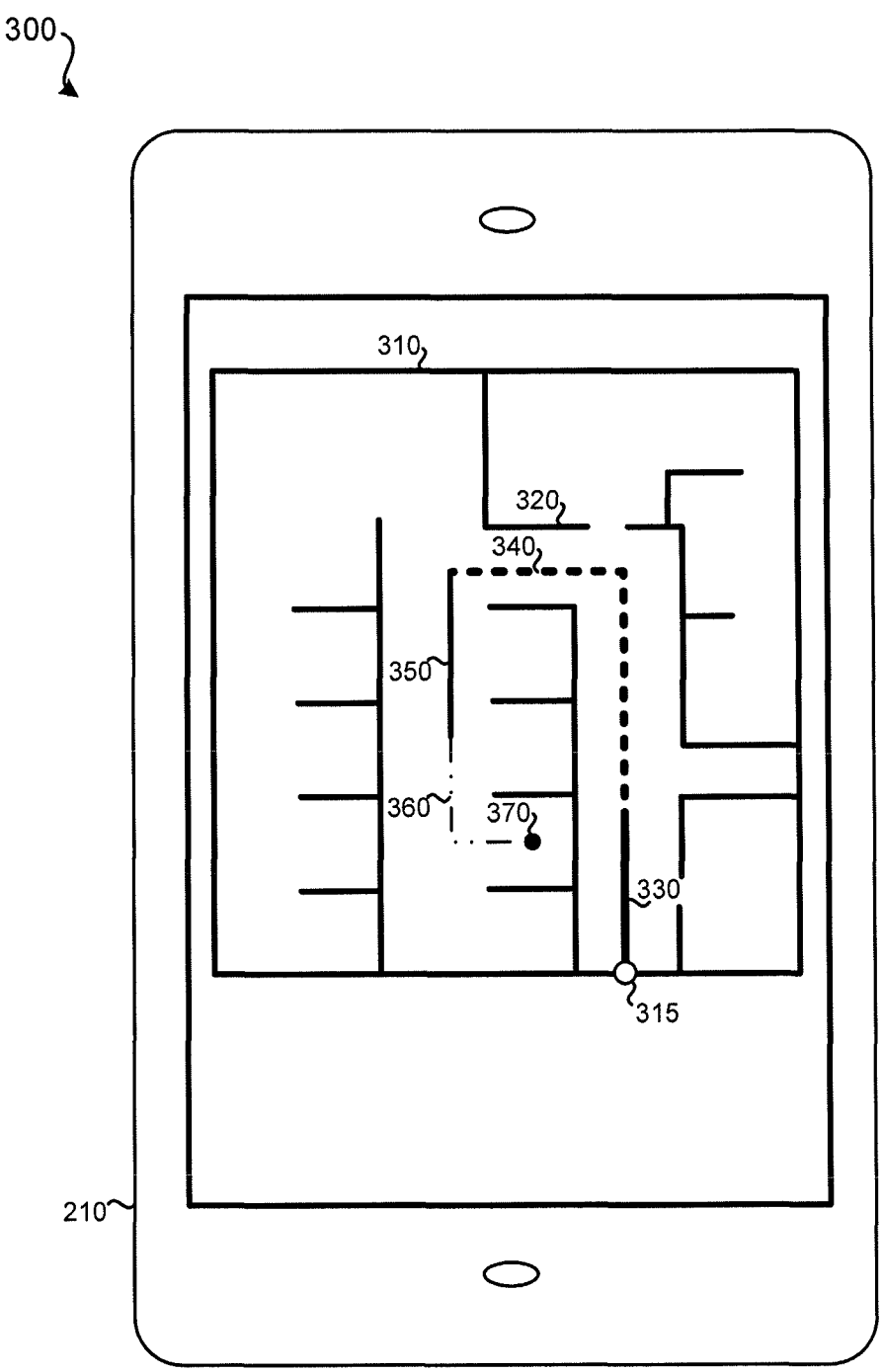
FIG. 3 illustrates an embodiment of a mobile device displaying a floor plan and tracking movement of the mobile device using dead reckoning.

FIG. 3 illustrates an embodiment of a mobile device 300 configured to perform a dead reckoning technique and use a plurality of proximity sensors for limiting the inaccuracy of dead reckoning. Mobile device 300 may include system 100 or some other system for limiting the inaccuracy of dead reckoning. Mobile device 300 may represent any or all of mobile device 200A, 200B, and/or 200C.

As illustrated, mobile device 300 is displaying a floor map of the interior of a floor of a building with the location of mobile device 300 tracked. Floor map 310 may be stored by or accessible to mobile device 300. When mobile device 300 has been determined to be located somewhere on floor map 310, floor map 310 may be selected from a set of floor maps to be displayed. Determining the appropriate floor map to use may be based on user input (e.g., the user selects a floor map from the set of floor maps) or the mobile device may use data from a location determining module to determine which floor map is appropriate.

Fix location 315 may indicate the last determined location of mobile device 300 using a location determining module and, thus, also where mobile device 300 ceased being able to use the location determining module to determine its location. As illustrated, fix location 315 is located at an entrance present on floor map 310. A fix location near an entrance to the interior of a building may be common because interference from the building represented by floor map 310 may reduce the ability to effectively use a location determining module. Fix location 315 may also indicate the position where a dead reckoning technique commenced being used and the location used as the starting point for the dead reckoning technique.

A path traveled by mobile device 300 (and the user possessing mobile device 300) may be indicated on floor map 310 as displayed by mobile device 300. This may allow a user of mobile device 300 to determine his or her location on the floor of the building represented by floor map 310. While floor map 310 is illustrated as presented by mobile device 300, additionally or alternatively, the floor map may be presented remotely to some other user. As such, mobile device 300 may be used by some other party to track the user possessing mobile device 300. Acceleration data collected by one or more accelerometers, directional data from a magnetometer, and/or a known or estimated distance traveled for each step taken by a user may be used to determine how far and in what direction a user has traveled, as indicated by floor map 310.

Depending on where mobile device 300 is located in relation to the user possessing mobile device 300, various confidence levels may be indicated along the path that mobile device 300 was determined to travel using the dead reckoning technique. For example, each line segment may indicate, such as by color and/or pattern, where mobile device 300 was determined to be positioned in relation to the user. For example, line segments 330 and 350 may indicate mobile device 300 was in a pocket of the user. Dotted line segment 340 may indicate mobile device 300 was being gripped in a hand of the user. Line segment 360 may indicate that mobile device 300 was placed in a backpack or was otherwise remote from the user. Location 370 may be a current location of mobile device 300 that is determined using a dead reckoning technique. This position may represent an estimate and is affected by the accuracy of previous measurements of movement made using the dead reckoning technique. Based on how the mobile device was held by the user, the distance traveled, and/or the elapsed time, a confidence level may be provided in conjunction with location 370.

Rather than location 370 representing the current position of mobile device 300 (and the user), location 370 may indicate the location where the dead reckoning technique was discontinued being performed by mobile device 300. The dead reckoning technique may have been discontinued because the determined locations are no longer considered accurate enough to be useful. Determining to cease making dead reckoning measurements may be based on an elapsed time since the dead reckoning technique began being used, an elapsed traveled distance by mobile device 300, and/or the position(s) of mobile device 300 in relation to the user while the dead reckoning technique was being performed. If performing the dead reckoning technique is stopped, one or more components of mobile device 300 may be powered down to conserve power.

Figure 4:
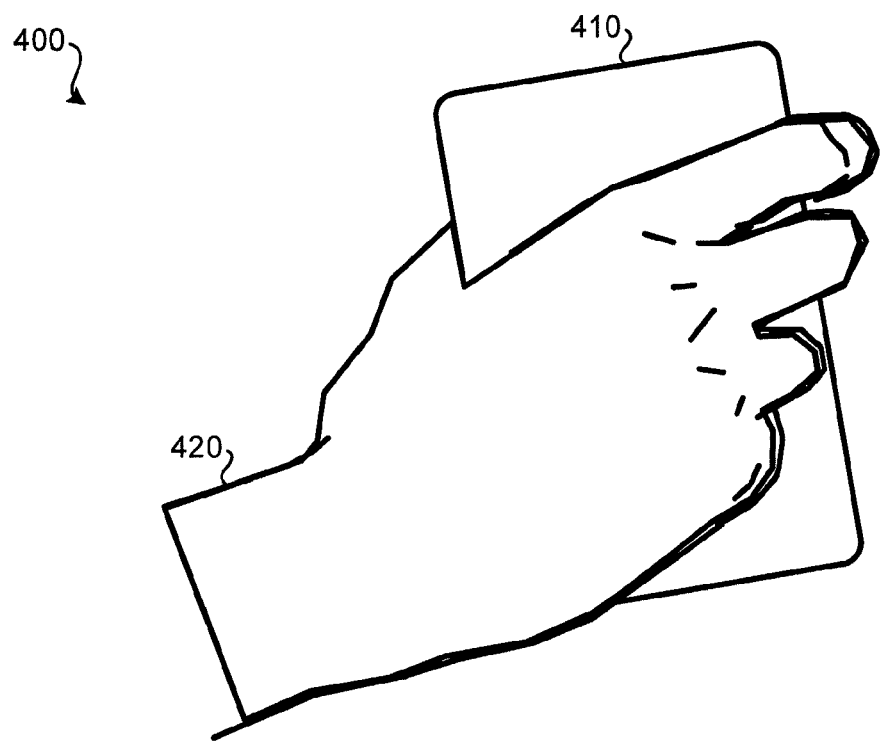
FIG. 4 illustrates an embodiment of a mobile device configured to use a plurality of proximity sensors for limiting the inaccuracy of dead reckoning being held by a user.

FIG. 4 illustrates an embodiment 400 of a mobile device 410 configured to use a plurality of proximity sensors for limiting the inaccuracy of dead reckoning being held by a user. Mobile device 410 may represent mobile device 200A, 200B, 200C, or 300 or some other mobile device configured to use a plurality of proximity sensors for limiting the inaccuracy of dead reckoning. Mobile device 410 may include system 100 of FIG. 1 or some other system for limiting the inaccuracy of a dead reckoning technique. Embodiment 400 represents how mobile device 410 may be held by a user while the user is walking or using mobile device 410.

Mobile device 410 may be held by hand 420 of a user. Proximity sensors, such as proximity sensor 280 of FIG. 2C and a proximity sensor or electrode on the opposite side of the mobile device, may collect proximity data that indicates hand 410 is proximate. Such proximity sensors indicating proximity to a triggering entity without other proximity sensors indicating proximity to a triggering entity may indicate mobile device 410 is likely being held in a user's hand 420, but not being held to the user's ear. For example, the display of mobile device 410 may be being used (possibly while the user is walking), the user may be typing or otherwise inputting data to the mobile device (again, possibly while the user is walking), or mobile device 410 may be being held at the user's side (possibly while the user is walking).

Figure 5:
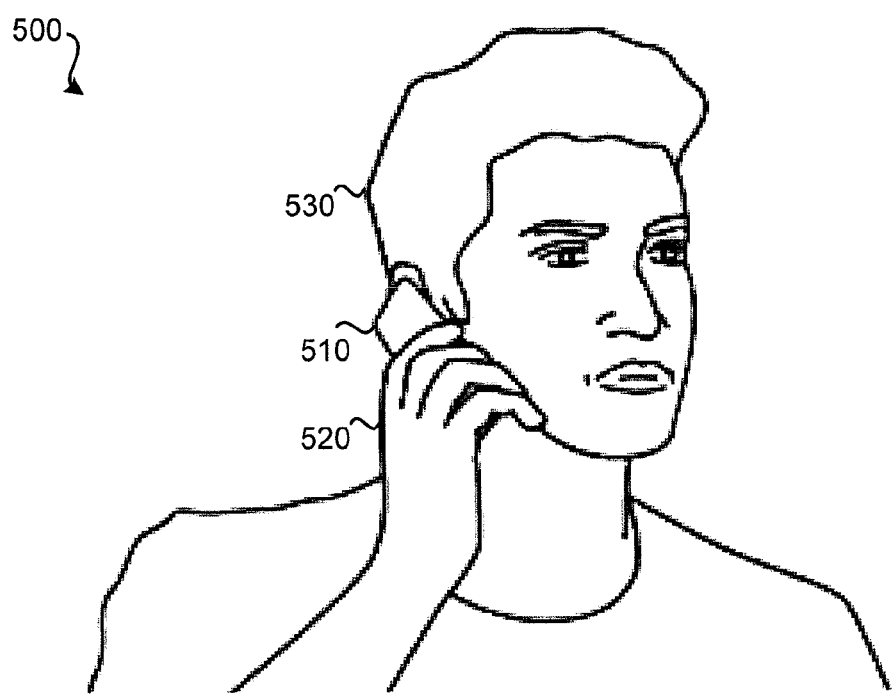
FIG. 5 illustrates an embodiment of a mobile device configured to use a plurality of proximity sensors for limiting the inaccuracy of dead reckoning being held to an ear of a user.

FIG. 5 illustrates an embodiment 500 of a mobile device 510 configured to use a plurality of proximity sensors for limiting the inaccuracy of dead reckoning being performed while mobile device 510 is held by user 530. Mobile device 510 may represent mobile device 200A, 200B, 200C, 300, 410, or some other mobile device configured to use a plurality of proximity sensors for limiting the inaccuracy of dead reckoning. Mobile device 510 may include system 100 of FIG. 1 or some other system for limiting the inaccuracy of dead reckoning. Embodiment 500 represents how mobile device 510 may be held by a user while the user is talking and, possibly, walking while using mobile device 510.

Mobile device 510 may be held by hand 520 of user 530. Proximity sensors, such as proximity sensor 280 of FIG. 2C and a proximity sensor or electrode on the opposite side of the mobile device, may collect proximity data that indicates hand 520 is proximate. Additionally, one or more proximity sensors, such as proximity sensors 250 and 255 of mobile device 200A of FIG. 2A may collect proximity data that indicates a triggering entity is proximate, in this case an ear of user 530. While user 530 is talking on and/or listening to mobile device 510, user 530 may be walking. As such, dead reckoning may be performed while mobile device 510 is being held to an ear of user 530.

Figure 6:
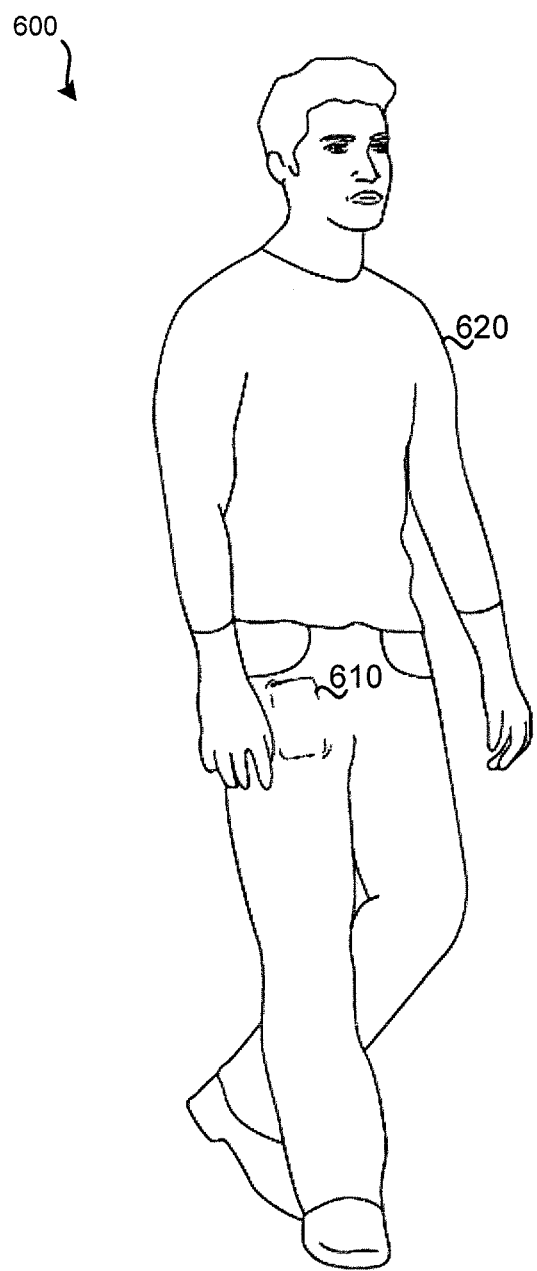
FIG. 6 illustrates an embodiment of a device configured to use a plurality of proximity sensors for limiting the inaccuracy of dead reckoning being carried in a user's pocket.

FIG. 6 illustrates an embodiment 600 of a mobile device 610 configured to use a plurality of proximity sensors for limiting the inaccuracy of dead reckoning being possessed by a user 620 in a pocket of user 620. Mobile device 610 may represent mobile device 200A, 200B, 200C, 300, 410, 510, or some other mobile device configured to use a plurality of proximity sensors for limiting the inaccuracy of dead reckoning. Mobile device 610 may include system 100 of FIG. 1 or some other system for limiting the inaccuracy of dead reckoning. Embodiment 600 represents how mobile device 610 may be carried by user 620 while user 620 is walking. While user 620 is walking, the length of time and/or distance that dead reckoning is performed for may at least be partially based on the position of mobile device 610 in relation to user 620.

Testing has shown that, typically, dead reckoning is most accurate when the mobile device is in a pocket of the user, such that movement of mobile device 610 is closely correlated to the movement of user 620. As the movement of mobile device 610 is less correlated to the movement of user 620's body, dead reckoning tends to be less accurate. In descending order of accuracy, the positions examined for accuracy during dead reckoning were: mobile device in a pocket of the user, mobile device held to the user's ear, mobile device in the user's hand, mobile device remote from user (e.g., in a handbag or backpack).

In FIG. 6, user 620 is walking with mobile device 610 in a front pant pocket. While mobile device 610 is in the front pant pocket, proximity sensors may be triggered, such as, referring to FIG. 2A, proximity sensors 260 and 265. These proximity sensors may indicate proximity to a triggering entity if the face of mobile device 610 is against the user's leg. Alternatively, if the back of mobile device 610 is against the user's leg, proximity sensors such as proximity sensors 270 and 275 of FIG. 2B may indicate proximity to a triggering entity. If no other proximity sensors indicate proximity to a triggering entity, it may be determined mobile device 610 is located within a pant or shirt pocket of user 620.

Figure 7:
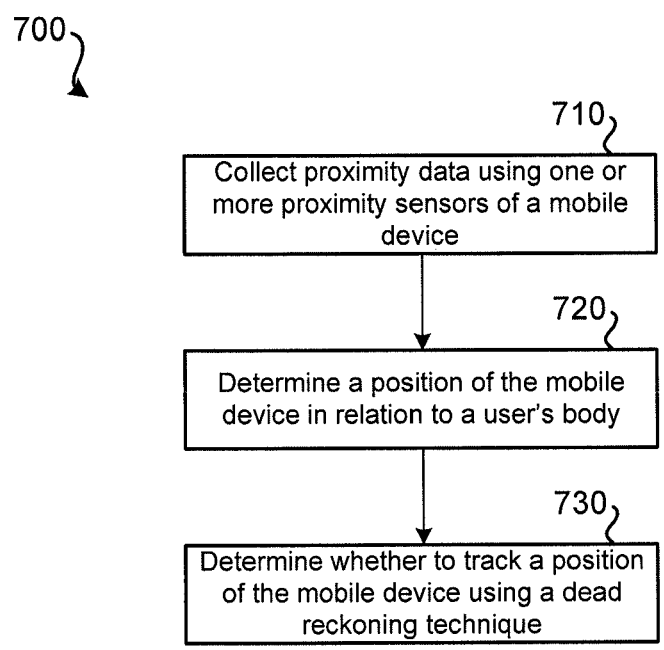
FIG. 7 illustrates an embodiment of method for using a plurality of proximity sensors for limiting the inaccuracy of dead reckoning.

FIG. 7 illustrates an embodiment of method 700 for using a plurality of proximity sensors for limiting the inaccuracy of dead reckoning. Method 700 may be performed using system 100 or some other system configured to use a plurality of proximity sensors for limiting the inaccuracy of dead reckoning. Method 700 may be performed by a mobile device containing system 100 such as mobile devices 200A, 200B, 200C, 300, 410, and/or 510 of FIGS. 2A through 5, respectively. Each step of method 700 may be performed by a mobile device. More specifically, steps of method 700 may be performed by system 100 and/or individual components of system 100. Method 700 may be performed using a computer system as a series of processor-readable instructions stored on a (non-transitory) computer-readable medium, such as in memory. Means for performing method 700 include a mobile device and a system configured to use a plurality of proximity sensors for limiting the inaccuracy of dead reckoning, such as system 100 of FIG. 1.

At step 710, proximity data may be collected using one or more proximity sensors of a mobile device. Proximity data may be received by the processor from each proximity sensor of the mobile device. The proximity data may indicate whether or not the proximity sensor is proximate to a triggering entity (such as part of a user). The proximity data may comprise a magnitude that indicates how close the triggering entity is to the proximity sensor. For example, the greater the magnitude indicated by the data received from the proximity sensor, the closer the triggering entity is to the proximity sensor. If a triggering entity, such as a user, is not near a proximity sensor, no data may be received from the proximity sensor, or data indicating no triggering entity is proximate may be received by the processor. As such, lack of data from a proximity sensor may be interpreted as data that indicates no triggering entity is proximate to the proximity sensor.

At step 720, a position of the mobile device in relation to the user may be determined. The position in relation to the user may be determined using the proximity data collected at step 710. If proximity data indicates that the mobile device is only being gripped in a hand of the user (and is not proximate to an ear of the user), it may be determined the mobile device is likely being held in front of the user or at the user's side. If proximity data indicates the front or back of the mobile device is proximate to the user and the mobile device is not being gripped, it may be determined the mobile device is likely in a shirt pocket or pant of the user. If proximity data indicates the mobile device is being gripped and the mobile device's face is proximate to the user, it may be determined the mobile device is likely being held to the user's ear. If no proximity data indicates proximity to a triggering entity, it may be determined that the mobile device is not proximate to the user, such as set down on a surface or in a purse or backpack. Determining whether the mobile device is being held in a hand of the user may be at least partially based on whether a touch-screen display of the mobile device (or buttons or a keyboard) is being used.

At step 730, at least partially based on the determined position of the mobile device in relation to the user, it may be determined whether or not a dead reckoning technique should be used or continue to be used. For example, the dead reckoning technique may involve using data from one or more accelerometers and magnetometers to estimate where the mobile device has moved to since being located at a known location (e.g., the fix location). The fix may have been determined using some other location determining system, such as GPS, cellular signal triangulation, or forward link timing. Dead reckoning may not be used if the mobile device is not proximate to the user (e.g., the mobile device is located in a purse or backpack away from the user's body). Dead reckoning may be used if the mobile device is located in a pocket of the user. Depending on how accurate of a location of the mobile device (and/or user) is desired, dead reckoning may or may not be used if the mobile device is positioned in a user's hand and/or against the user's ear. Based on where the mobile device is positioned in relation to the user, dead reckoning may be used for different amounts of time and/or a different maximum tracked distance. In some embodiments, user preferences, set by a user, may determine how long (in time or distance) dead reckoning may be used. If a dead reckoning technique is not to be used, one or more components related to performing dead reckoning may be powered down to conserve battery power of the mobile device.

Figure 8:
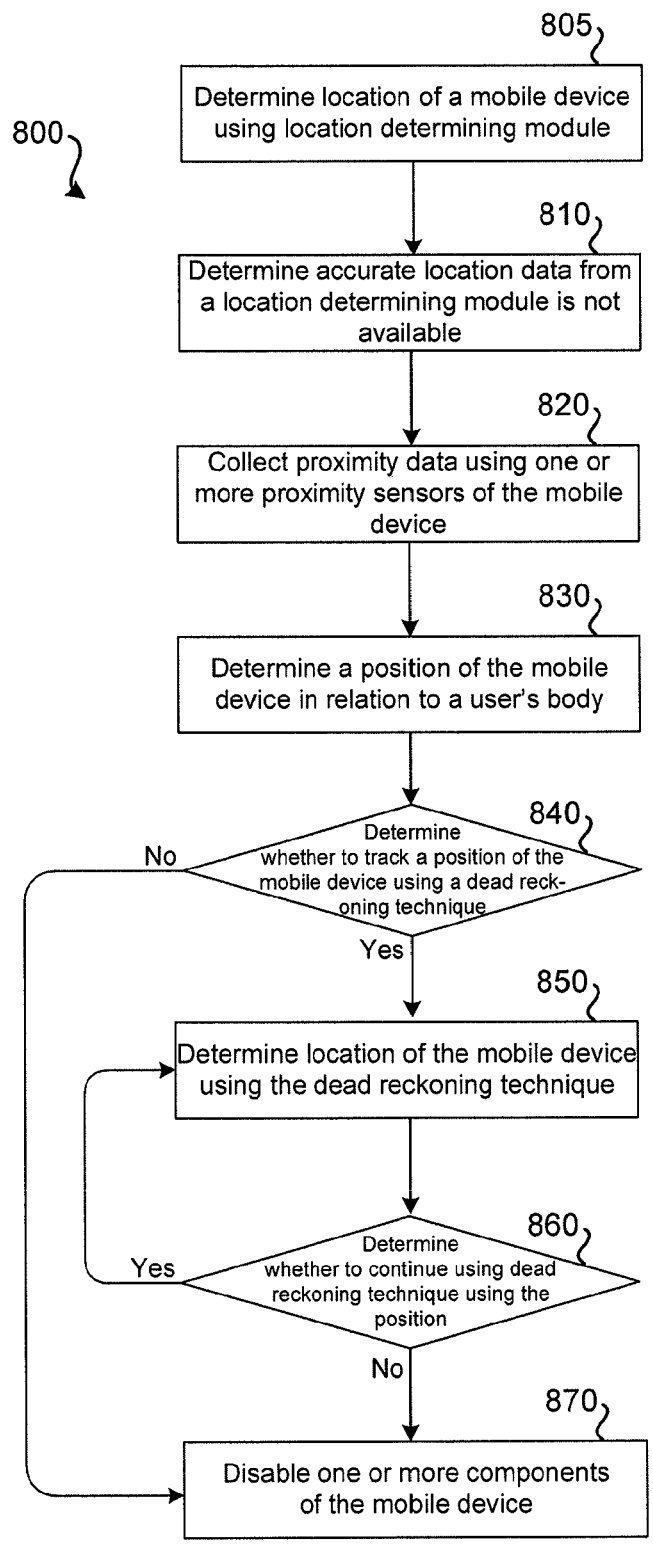
FIG. 8 illustrates another embodiment of a method for using a plurality of proximity sensors for limiting the inaccuracy of dead reckoning.

FIG. 8 illustrates another embodiment of a method 800 for using a plurality of proximity sensors for limiting the inaccuracy of a dead reckoning technique. Method 800 may be performed using system 100 or some other system configured to use a plurality of proximity sensors for limiting the inaccuracy of dead reckoning. Method 800 may be performed by a mobile device containing system 100 such as mobile device 200A, 200B, 200C, 300, 410, or 510 of FIGS. 2A through 5, respectively. More specifically, each step of method 800 may be performed using system 100 or a similar system. Method 800 may be performed by a computer system as a series of computer-readable instructions stored on a (non-transitory) computer-readable medium, such as in memory. Means for performing each step of method 800 include mobile devices, such as cellular phones and, specifically, smart phones. Method 800 may represent a more detailed embodiment of method 700 or a separate method.

At step 805, a location of a mobile device may be determined using a location determining module of the mobile device, such as location determining module 160 of FIG. 1. This may result in an absolute location of the mobile device being determined. As previously discussed, an absolute location is not necessarily high accuracy; an absolute location refers to a location in a coordinate system such as latitude and longitude, street address, etc. For example, GPS or cellular tower multilateration may be used to determine an absolute location. As detailed in relation to FIG. 1, a location determining module may involve the use of GPS, cellular triangulation, forward link timing, or some other method of determining location. Determining the location of the mobile device using a location determining module may be preferable over using a dead reckoning technique as long as the necessary signal or signals can be received by the location determining device. For example, if the location determining module is able to receive signals from three GPS satellites, GPS may be used to determine the position of the mobile device. Use of a location determining module may be preferable to using a dead reckoning technique because a location as determined using the location determining module may be expected to be more accurate.

At step 810, a determination that use of a location determining module is not available may be made. For example, the determination may be based on inadequate signal strength and/or an inadequate number of signals being received by the location determining module. Such interference may be due to the mobile device being located within a structure, such as a building that is obstructing the signals required to be received by the location determining module. If accurate location data cannot be collected by the location determining module, the location determining module may be disabled to conserve battery power. Periodically, the location determining module may reattempt to determine a location of the mobile device. If successful, use of dead reckoning may cease.

At step 820, proximity data may be collected using one or more proximity sensors of a mobile device. Such proximity data may be collected by proximity sensors such as illustrated and described in relation to FIGS. 2A, 2B, and 2C. Proximity data may be received by the processor from each proximity sensor of the mobile device. The proximity data may indicate whether or not the proximity sensor is proximate to a triggering entity (such as part of a user). The proximity data may comprise a magnitude that indicates how close the triggering entity is to the proximity sensor. For example, the greater the magnitude indicated by the data received from the proximity sensor, the closer the triggering entity is to the proximity sensor. If a triggering entity, such as a user, is not near a proximity sensor, no data may be received from the proximity sensor, or data indicating no triggering entity is proximate may be received by the processor. As such, lack of data from a proximity sensor may be interpreted as data that indicates no triggering entity is proximate to the proximity sensor.

At step 830, a position of the mobile device in relation to a user possessing the mobile device may be determined. The position in relation to the user may be determined using the proximity data received at step 620. Common positions may include: 1) the mobile device being held to an ear of the user; 2) the mobile device being held in a hand of the user; 3) the mobile device being in a pocket of the user; and 4) the mobile device being carried by the user in a vessel, such as purse or backpack, such that the mobile device is physically remote from the body of the user. If proximity data from proximity sensors such as proximity sensor 280 of FIG. 2C indicates proximity to a triggering entity, it may be determined the mobile device is likely being held in a hand in front of the user or at the user's side. If proximity data from proximity sensors, such as proximity sensors 270 and 275 of FIG. 2B or proximity sensors 260 and 265 of FIG. 2A indicate the front or back of the mobile device is proximate to a triggering entity and the mobile device is not being gripped as indicated by proximity data from proximity sensors such as proximity sensor 280 of FIG. 2C, it may be determined the mobile device is likely in a shirt or pant pocket of the user. If proximity data from proximity sensors such as proximity sensor 280 of FIG. 2C and proximity sensors 250 and 255 of FIG. 2A indicates proximity to a triggering entity, it may be determined the mobile device is likely being held to the user's ear. If proximity data does not indicate proximity to a triggering entity, it may be determined the mobile device is not likely proximate to a user, such as being remotely carried in a purse or backpack. Other positions of the mobile device in relation to a user may be possible. For example, additional proximity sensors may be used to identify additional positions of the mobile device in relation to the user.

At step 840, at least partially based on the determined position of the mobile device in relation to the user's body, it may be determined whether or not a dead reckoning technique should be used to update (e.g., determine one or more times) or track (e.g., determine multiple times) the location of the mobile device. For example, the dead reckoning technique may involve using data from one or more accelerometers and/or magnetometers, such as accelerometer 130 and/or magnetometer 170 of FIG. 1 to estimate where the mobile device has moved to since being located at a known location (the fix location), such as the last location determined by the location determining module at step 805. Dead reckoning may not be used if the mobile device is not proximate to the user (e.g., the mobile device is located in a purse or backpack away from the user's body).

Dead reckoning may be used if the mobile device is located in a pocket of the user. Depending on how accurate of a position is desired, dead reckoning may or may not be used if the mobile device is located in a user's hand and/or against the user's ear. Based on the position in relation to the user's body, the mobile device may be configured to determine whether dead reckoning should be performed or not. If dead reckoning is to be used, method 800 may proceed to step 850. If dead reckoning is not to be used, method 800 may proceed to step 870.

In some embodiments, whether or not dead reckoning is performed may be due to defined settings accessible to the mobile device. Such settings may be configured by the user of the mobile device or may be configured by the service provider or manufacturer of the mobile device. Table 1 provides an example of data that may be used to define whether or not dead reckoning is used to locate and track the mobile device and, if so, for how long. It should be understood that the values presented in Table 1 are for exemplary purposes only.

TABLE 1

| Position of Mobile Device | Dead Reckoning to be Performed? | Maximum Amount of Time for Performing Dead Reckoning | Maximum Distance for Performing Dead Reckoning |
| --- | --- | --- | --- |
| User's Hand | Yes | 2 min | 200 ft. |
| User's ear | Yes | 3 min | 300 ft. |
| User's pocket | Yes | 5 min | 500 ft. |
| Remote | No | — | — |

Data accessible by the mobile device, such as on a non-transitory storage medium, may indicate whether dead reckoning is to be performed when the mobile device is in a particular position in relation to the user, an amount of time dead reckoning is permitted to be performed for, and/or a maximum distance dead reckoning is permitted to conducted over. If, over the course of performing a dead reckoning technique, the mobile device is positioned in multiple positions in relation to the user, the maximum amount of time and distance may be averaged. In some embodiments, the shorter of the different periods of time or the shorter distance may be used. For example, if a mobile device is held to a user's ear and is also in a user's pocket over the course of dead reckoning being performed, dead reckoning may be performed for 3.5 minutes or 350 ft, whichever is shorter if an averaging technique is used. In the same situation, dead reckoning may be performed for 3 minutes or 300 ft, whichever is shorter, if the smaller permitted value technique is used.

At step 850, the location of the mobile device may be determined using the dead reckoning technique. Determining the location of the mobile device over a period of time may result in the location of the mobile device being tracked. Data from one or more accelerometers and/or magnetometers may be used to determine whether the user has taken a step (while possessing the mobile device) and in what direction. Using the fix location determined at step 805, the determined direction, and/or a determination that a step has been taken, a new location of the mobile device and the user may be determined. As additional steps are taken, new locations may be determined based on the fix and the previously determined steps. As such, a relative position may be determined using dead reckoning at step 850 based on an absolute location determined at step 805. Step 850, based on the position of the mobile device in relation to the user, may only be permitted to be performed for a predefined period of time and/or a maximum distance, such as defined in Table 1. For example, depending on the location of the mobile device in relation to the user's body, the error rate for determining the position of the user using dead reckoning may vary. If the mobile device is in a position on the user's body that is associated with a low rate of error, such as in a pocket against the user's leg, dead reckoning may be permitted to be performed for a longer period of time and/or a greater aggregate distance (e.g., a greater number of steps) than if the mobile device was being grasped in a hand of the user.

At step 860, a determination may be made as to whether dead reckoning should continue to be performed. Step 860 may be evaluated periodically while dead reckoning is being performed. Step 860 may be performed in relation to stored conditions, such as presented in Table 1. If a predefined period of time or predefined distance associated with the position of the mobile device in relation to the user's body has elapsed or been reached, method 800 may proceed to step 870. If such a maximum has not been reached, step 850 may continue to be performed until: 1) the location determining is able to determine the user's position; or 2) a maximum distance or time is reached.

Continuing to perform dead reckoning may also be based on whether the location determining module can currently accurately determine the location of the mobile device. For example, if a user is within a building, in certain parts of the building, the location determining module may be able to determine the position of the mobile device, while in other locations with the building, the location determining module cannot determine the location of the mobile device. If the location determining module is available to determine the location, the mobile device may default to using the location determining module rather than dead reckoning. In some embodiments, the mobile device may determine and select dead reckoning or the location determining module based on which is more likely to provide an accurate location. If the location determining module is available for a short period of time, such as just to provide a single location point of the mobile device, this location may be used as a new fix location, and dead reckoning may be used to determine other locations of the mobile device and user as both move.

At step 870, tracking the user's position using dead reckoning may stop. This may involve powering down one or more components of the mobile device to conserve power, such as: one or more accelerometers, one or more magnetometers, and/or one or more proximity sensors. Further, processing the data from some or all proximity sensors may no longer be needed if dead reckoning has ceased to be performed.

Figure 9:
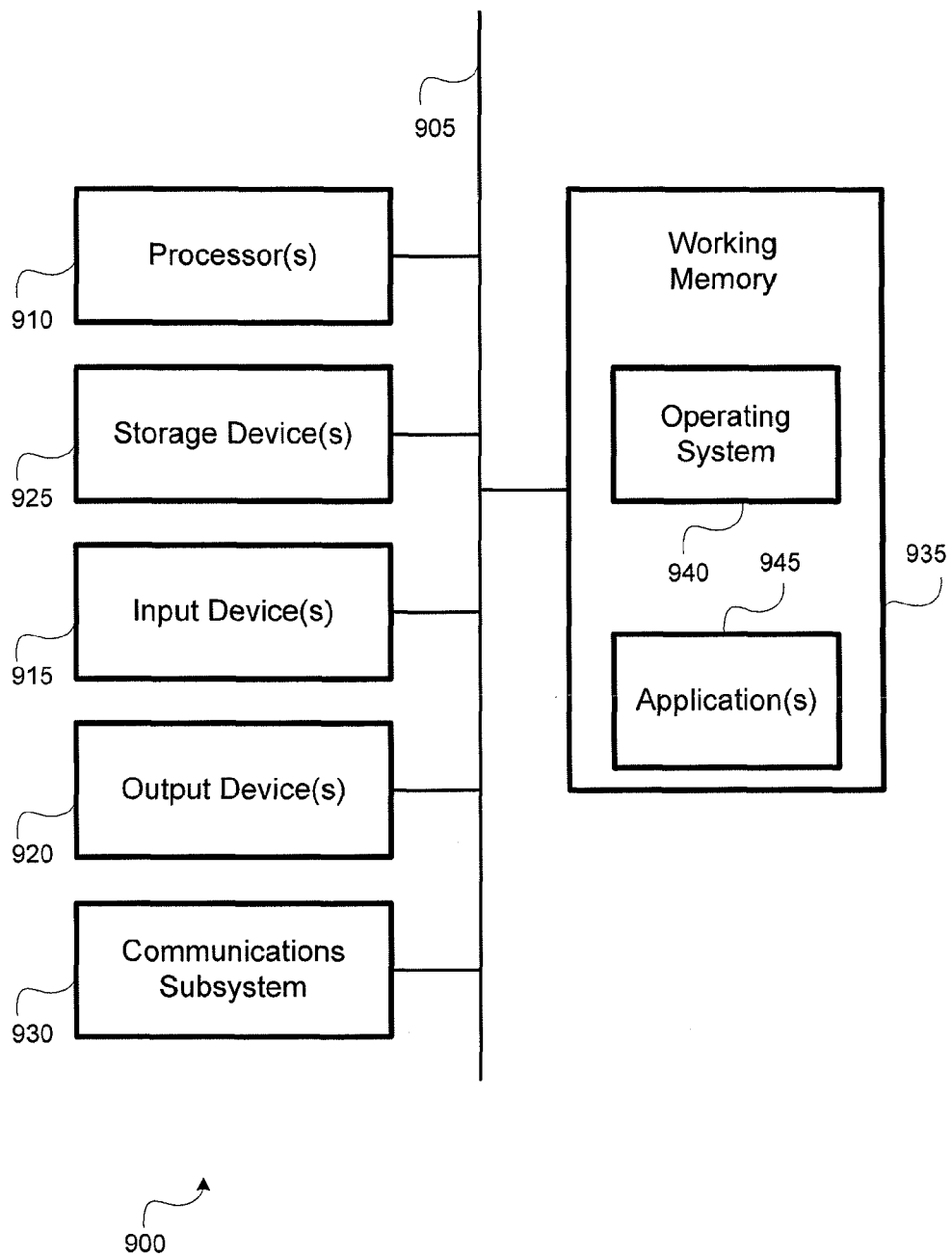
FIG. 9 illustrates an embodiment of a computer system.

FIG. 9 illustrates an embodiment of a computer system. Computer system 900 can represent some of the components of the mobile devices and systems discussed in this application. For example, mobile devices, as detailed herein, may contain computer system 900 and system 100. FIG. 9 provides a schematic illustration of one embodiment of a computer system 900 that can perform the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method comprising:
    collecting proximity data using a plurality of proximity sensors of the mobile device;
    determining a position of the mobile device in relation to a user of the mobile device, the position determined using the proximity data;
    determining a first geographic location of a mobile device using an absolute geographic location measurement; and
    selecting a maximum allowed period of time from a plurality of maximum allowed periods of time, based on the position of the mobile device in relation to the user determined using the proximity data, to track the mobile device using a dead reckoning technique,
    wherein the dead reckoning technique comprises determining a second geographic location of the mobile device based, at least in part, on information indicative of displacement of the mobile device from the first geographic location; and
    wherein each of the plurality of maximum allowed periods of time is associated with a different position of the mobile device in relation to the user.

2. The method of claim 1, further comprising:
    tracking, via the dead reckoning technique, the mobile device for up to the maximum allowed period of time.

3. The method of claim 1, wherein, in response to determining that the mobile device is proximate to a chest or a leg of the user, selecting a first maximum allowed period of time from the plurality of maximum allowed periods of time, the first maximum allowed period of time having a duration longer than a second maximum allowed period of time from the plurality of maximum allowed periods of time, the second maximum allowed period of time associated with the mobile device being proximate to an ear of the user.

4. The method of claim 1, wherein, in response to determining that the mobile device is proximate to an ear of the user, selecting a first maximum allowed period of time from the plurality of maximum allowed periods of time, the first maximum allowed period of time having a duration shorter than a second maximum allowed period of time from the plurality of maximum allowed periods of time, the second maximum allowed period of time associated with the mobile device being proximate to a leg or chest of the user.

5. The method claim 1, wherein, in response to determining that the mobile device is gripped in a hand of the user, selecting a first maximum allowed period of time from the plurality of maximum allowed periods of time, the first maximum allowed period of time having a duration shorter than a second maximum allowed period of time from the plurality of maximum allowed periods of time, the second maximum allowed period of time associated with the mobile device being proximate to a leg or chest of the user.

6. The method of claim 1, wherein the information indicative of displacement comprises acceleration data that is used to track the mobile device.

7. The method of claim 6, further comprising:
    collecting acceleration data using an accelerometer of the mobile device; and
    determining the second geographic location of the mobile device using the acceleration data.

8. The method of claim 1, wherein the plurality of proximity sensors is a plurality of capacitive proximity sensors.

9. The method of claim 1, further comprising:
    determining whether the mobile device is remote from the user; and
    in response to determining that the mobile device is remote from the user, ceasing to track the mobile device using the information indicative of displacement.

10. The method of claim 1, wherein:
    a first proximity sensor of the plurality of proximity sensors is proximate to a speaker of the mobile device;
    a second proximity sensor of the plurality of proximity sensors is configured to determine whether the user is gripping the mobile device.

11. The method of claim 1, wherein:
    in response to determining that the mobile device is proximate to a chest or a leg of the user, selecting a first maximum allowed period of time from the plurality of maximum allowed periods of time, the first maximum allowed period of time having a duration longer than a second maximum allowed period of time from the plurality of maximum allowed periods of time, the second maximum allowed period of time associated with the mobile device being proximate to an ear of the user; and in response to determining that the mobile device is gripped in a hand of the user, selecting a third maximum allowed period of time from the plurality of maximum allowed periods of time, the third maximum allowed period of time having a duration shorter than the second maximum allowed period of time.

12. The method of claim 1, wherein the determining the position of the mobile device in relation to the user of the mobile device includes:

determining a body part of the user that the mobile device is in closest proximity to from a plurality of body parts.

13. The method of claim 12, wherein the selecting the maximum allowed period of time from the plurality of maximum allowed periods of time is based on the determined body part.

14. A mobile device comprising:

a plurality of proximity sensors; and a processor configured to:

collect proximity data using the plurality of proximity sensors;

determine a position of the mobile device in relation to a user of the mobile device, the position determined using the proximity data;

determine a first geographic location of a mobile device using an absolute geographic location measurement; and select a maximum allowed period of time from a plurality of maximum allowed periods of time, based on the position of the mobile device in relation to the user determined using the proximity data, to track the mobile device using a dead reckoning technique, wherein the dead reckoning technique comprises determining a second geographic location of the mobile device based, at least in part, on information indicative of displacement of the mobile device from the first geographic location; and wherein each of the plurality of maximum allowed periods of time is associated with a different position of the mobile device in relation to the user.

15. The mobile device of claim 14, wherein the processor is further configured to:

track, via the dead reckoning technique, the mobile device for up to the maximum allowed period of time.

16. The mobile device of claim 14, wherein the processor is further configured to:

in response to determining that the mobile device is proximate to a chest or a leg of the user, select a first maximum allowed period of time from the plurality of maximum allowed periods of time, the first maximum allowed period of time having a duration longer than a second maximum allowed period of time from the plurality of maximum allowed periods of time, the second maximum allowed period of time associated with the mobile device being proximate to an ear of the user.

17. The mobile device of claim 14, wherein the processor is further configured to:

in response to determining that the mobile device is proximate to an ear of the user, select a first maximum allowed period of time from the plurality of maximum allowed periods of time, the first maximum allowed period of time having a duration shorter than a second maximum allowed period of time from the plurality of maximum allowed periods of time, the second maximum allowed period of time associated with the mobile device being proximate to a chest or leg of the user.

18. The mobile device of claim 14, wherein the processor is further configured to:

in response to determining that the mobile device is gripped in a hand of the user, select a first maximum allowed period of time from the plurality of maximum allowed periods of time, the first maximum allowed period of time having a duration shorter than a second maximum allowed period of time from the plurality of maximum allowed periods of time, the second maximum allowed period of time associated with the mobile device being proximate to a chest or leg of the user.

19. The mobile device of claim 14, the mobile device further comprising:

an accelerometer, wherein the information indicative of displacement comprises acceleration data obtained from the use of the accelerometer.

20. The mobile device of claim 14, wherein the plurality of proximity sensors is a plurality of capacitive proximity sensors.

21. The mobile device of claim 14, wherein the processor is further configured to:

determine whether the mobile device is remote from the user; and in response to determining that the mobile device is remote from the user, cease to track the mobile device using the information indicative of displacement.

22. The mobile device of claim 14, wherein:

a first proximity sensor of the plurality of proximity sensors is proximate to a speaker of the mobile device; and a second proximity sensor of the plurality of proximity sensors is configured to determine whether the user is gripping the mobile device.

23. The mobile device of claim 21, wherein:

a third proximity sensor of the plurality of proximity sensors is proximate to a back of the mobile device, wherein a first proximity sensor of the plurality of proximity sensors and a second proximity sensor of the plurality of proximity sensors are on a face of the mobile device.

24. A non-transitory computer-readable storage medium comprising processor-readable instructions, which, when executed by a processor, cause the processor to:

analyze proximity data received from a plurality of proximity sensors;

determine a position of a mobile device in relation to a user of the mobile device, the position determined using the proximity data;

determining a first geographic location of a mobile device using an absolute geographic location measurement; and select a maximum allowed period of time from a plurality of maximum allowed periods of time, based on the position of the mobile device in relation to the user determined using the proximity data, during which to track the mobile device using a dead reckoning technique, wherein the dead reckoning technique comprises determining a second geographic location of the mobile device based, at least in part, on information indicative of displacement of the mobile device from the first geographic location; and wherein each of the plurality of maximum allowed periods of time is associated with a different position of the mobile device in relation to the user.

25. The non-transitory computer-readable storage medium of claim 24, wherein the processor-readable instructions further comprise processor-readable instructions, which, when executed by the processor, cause the processor to:

track, via the dead reckoning technique, the mobile device for up to the maximum allowed period of time.

26. The non-transitory computer-readable storage medium of claim 24, wherein the processor-readable instructions further comprise processor-readable instructions, which, when executed by the processor, cause the processor to:

in response to determining that the mobile device is proximate to a chest or a leg of the user, select a first maximum allowed period of time from the plurality of maximum allowed periods of time, the first maximum allowed period of time having a duration longer than a second maximum allowed period of time from the plurality of maximum allowed periods of time, the second maximum allowed period of time associated with the mobile device being proximate to an ear of the user.

27. The non-transitory computer-readable storage medium of claim 24, wherein the processor-readable instructions further comprise processor-readable instructions, which, when executed by the processor, cause the processor to:

in response to determining that the mobile device is proximate to an ear of the user, select a first maximum allowed period of time from the plurality of maximum allowed periods of time, the first maximum allowed period of time having a duration shorter than a second maximum allowed period of time from the plurality of maximum allowed periods of time, the second maximum allowed period of time associated with the mobile device being proximate to a leg or chest of the user.

28. The non-transitory computer-readable storage medium of claim 24, wherein the processor-readable instructions further comprise processor-readable instructions, which, when executed by the processor, cause the processor to:

in response to determining that the mobile device is gripped in a hand of the user, select a first maximum allowed period of time from the plurality of maximum allowed periods of time, the first maximum allowed period of time having a duration shorter than a second maximum allowed period of time from the plurality of maximum allowed periods of time, the second maximum allowed period of time associated with the mobile device being proximate to a leg or chest of the user.

29. The non-transitory computer-readable storage medium of claim 24, wherein the dead reckoning technique comprises using acceleration data to determine the second geographic location of the mobile device.

30. The non-transitory computer-readable storage medium of claim 24, wherein the processor-readable instructions further comprise processor-readable instructions, which, when executed by the processor, cause the processor to:

determine whether the mobile device is remote from the user; and in response to determining that the mobile device is remote from the user, cease to track the mobile device using the dead reckoning technique.

31. The non-transitory computer-readable storage medium of claim 24, wherein:

a first proximity sensor of the plurality of proximity sensors is proximate to a speaker of the mobile device; and a second proximity sensor of the plurality of proximity sensors configured to determine whether the user is gripping the mobile device.

32. An apparatus comprising:

means for collecting proximity data on a mobile device;

means for determining a position of the mobile device in relation to a user of the mobile device, the position determined using the proximity data;

means for determining a first geographic location of a mobile device using an absolute geographic location measurement; and means for selecting a maximum allowed period of time from a plurality of maximum allowed periods of time, based on the position of the mobile device in relation to the user determined using the proximity data, to track the mobile device using a dead reckoning technique, wherein the dead reckoning technique comprises determining a second geographic location of the mobile device based at least in part on information indicative of displacement of the mobile device from the first geographic location; and wherein each of the plurality of maximum allowed periods of time is associated with a different position of the mobile device in relation to the user.

33. The apparatus of claim 32, further comprising:

means for tracking, via the dead reckoning technique, the mobile device for up to the maximum allowed period of time.

34. The apparatus of claim 32, further comprising means for, in response to determining that the mobile device is proximate to a chest or a leg of the user, selecting a first maximum allowed period of time from the plurality of maximum allowed periods of time, the first maximum allowed period of time having a duration longer than a second maximum allowed period of time from the plurality of maximum allowed periods of time, the second maximum allowed period of time associated with the mobile device being proximate to an ear of the user.

35. The apparatus of claim 32, further comprising means for, in response to determining that the mobile device is proximate to an ear of the user, selecting a first maximum allowed period of time from the plurality of maximum allowed periods of time, the first maximum allowed period of time having a duration shorter than a second maximum allowed period of time from the plurality of maximum allowed periods of time, the second maximum allowed period of time associated with the mobile device being proximate to a leg or chest of the user.

36. The apparatus of claim 32, further comprising means for, in response to determining that the mobile device is gripped in a hand of the user, selecting a first maximum allowed period of time t from the plurality of maximum allowed periods of time, the first maximum allowed period of time having a duration is shorter than a second maximum allowed period of time from the plurality of maximum allowed periods of time, the second maximum allowed period of time associated with the mobile device being proximate to a chest or leg of the user.

37. The apparatus of claim 32, wherein the information indicative of displacement comprises acceleration data used to determine the second geographic location of the mobile device.

38. The apparatus of claim 32, further comprising:
means for determining whether the mobile device is remote from the user; and
means for, in response to determining that the mobile device is remote from the user, ceasing to track the mobile device using the dead reckoning technique.

* * * * *